US011886593B2

(12) United States Patent
Jacquin et al.

(10) Patent No.: US 11,886,593 B2
(45) Date of Patent: *Jan. 30, 2024

(54) VERIFICATION OF A PROVISIONED STATE OF A PLATFORM

(71) Applicant: Hewlett Packard Enterprise Development LP, Spring, TX (US)

(72) Inventors: Ludovic Emmanuel Paul Noel Jacquin, Bristol (GB); Hamza Attak, Bristol (GB); Nigel Edwards, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,430

(22) Filed: Feb. 13, 2023

(65) Prior Publication Data
US 2023/0185920 A1  Jun. 15, 2023

Related U.S. Application Data

(63) Continuation of application No. 17/242,904, filed on Apr. 28, 2021, now Pat. No. 11,604,881, which is a (Continued)

(51) Int. Cl.
*G06F 21/57* (2013.01)
*H04L 9/06* (2006.01)

(52) U.S. Cl.
CPC .......... *G06F 21/572* (2013.01); *H04L 9/0643* (2013.01); *G06F 2221/033* (2013.01)

(58) Field of Classification Search
CPC . G06F 21/572; G06F 2221/033; H04L 9/0643
See application file for complete search history.

(56) References Cited

U.S. PATENT DOCUMENTS 7,870,399 B2  1/2011  Bryant et al.
8,312,271 B2  11/2012  Bangerter et al.
(Continued)

FOREIGN PATENT DOCUMENTS

CN  1439136 A  8/2003
CN  1965530 A  5/2007

OTHER PUBLICATIONS

Trusted Computing Group, "TPM 2.0 Library Specification", available online at <https://trustedcomputinggroup.org/resource/tpm-library-specification/>, Mar. 15, 2013, 9 pages.
(Continued)

*Primary Examiner* — Thaddeus J Plecha
(74) *Attorney, Agent, or Firm* — Trop, Pruner & Hu, P.C.

(57) ABSTRACT

A method of certifying a state of a platform includes receiving one or more software elements of a software stack of the platform by an authentication module and performing a hash algorithm on the software stack to generate one or more hash values. The software stack uniquely determines a software state of the platform. The method includes generating creation data, a creation hash, and a creation ticket, corresponding to the hash values and sending the creation ticket to the platform. The method also includes receiving the creation ticket by the authentication module and certifying the creation data and the creation hash based on the creation ticket. The method further includes generating a certified structure based on the creation data and performing the hash algorithm on the certified structure to generate a hash of the certified structure. The certified structure uniquely determines the software state of the platform.

20 Claims, 9 Drawing Sheets

Related U.S. Application Data continuation of application No. 16/222,293, filed on Dec. 17, 2018, now Pat. No. 11,017,090.

(56) References Cited

U.S. PATENT DOCUMENTS

| | | | |
|---|---|---|---|
| 8,566,606 | B2 | 10/2013 | Movva et al. |
| 8,949,997 | B2 | 2/2015 | Schmidt et al. |
| 9,147,086 | B1 | 9/2015 | Potlapally et al. |
| 9,246,690 | B1 | 1/2016 | Roth et al. |
| 11,017,090 | B2 | 5/2021 | Jacquin et al. |
| 11,095,454 | B2 | 8/2021 | Goldman et al. |
| 11,374,745 | B1 | 6/2022 | Khare |
| 2002/0107804 | A1 | 8/2002 | Kravitz |
| 2006/0010079 | A1 | 1/2006 | Brickell |
| 2006/0026423 | A1 | 2/2006 | Bangerter et al. |
| 2007/0143629 | A1 | 6/2007 | Hardjono et al. |
| 2008/0098107 | A1 | 4/2008 | Jones et al. |
| 2008/0178257 | A1 | 7/2008 | Mishina et al. |
| 2008/0271163 | A1 | 10/2008 | Stillerman et al. |
| 2010/0235912 | A1 | 9/2010 | Hermann et al. |
| 2013/0290735 | A1 | 10/2013 | Rombouts |
| 2013/0298219 | A1* | 11/2013 | Byrkit .................. G06F 21/567 726/12 |
| 2014/0189890 | A1 | 7/2014 | Koeberl et al. |
| 2014/0359268 | A1 | 12/2014 | Jauhiainen et al. |
| 2015/0227744 | A1* | 8/2015 | Horovitz ................ G06F 21/57 726/22 |
| 2017/0093800 | A1 | 3/2017 | Wiseman et al. |
| 2017/0147356 | A1* | 5/2017 | Kotary .................. G06F 21/72 |
| 2017/0373828 | A1 | 12/2017 | Michiels et al. |
| 2018/0287780 | A1 | 10/2018 | Safford et al. |
| 2020/0260278 | A1 | 8/2020 | Du et al. |
| 2020/0364340 | A1 | 11/2020 | Khoruzhenko |

OTHER PUBLICATIONS

Bernard Marr, "How Blockchain Will Transform the Supply Chain and Logistics Industry", available online at <https://www.forbes.com/sites/bernardmarr/2018/03/23/how-blockchain-will-transform-the-supply-chain-and-logistics-industry/#4795483b5fec>, Mar. 23, 2018, 4 pages.

Jack Harris and Raquel Hill, "Building a Trusted Image for Embedded Systems," Apr. 2010, pp. 1-4, ACM.

Lavina Jain and Jayesh Vyas, "Security Analysis of Remote Attestation," CS259 Project Report, 2008, pp. 1-8, Stanford University.

TCG, "TCG Infrastructure WG TPM Keys for Platform Identity for TPM 1.2," Aug. 21, 2015, pp. 1-68, Specification Version 1.0, Revision 3.

Tom Dodson and Monty Wiseman, "Trusted Supply Chain & Remote Provisioning with the Trusted Platform Module Link," RSA Conference 2018, Apr. 2018, pp. 1-19.

Trusted Computing Group, "TCG Platform Attribute Credential Profile", available online at <https://trustedcomputinggroup.org/resource/tcg-platform-attribute-credential-profile/>, Jan. 16, 2018, 3 pages.

Trusted Computing Group, "TPM Keys for Platform Identity for TPM 1.2", available online at <https://trustedcomputinggroup.org/resource/tpm-keys-for-platform-identity-for-tpm-1-2-2/>, Aug. 21, 2015, 3 pages.

* cited by examiner

VERIFICATION OF A PROVISIONED STATE OF A PLATFORM

CROSS-REFERENCE TO RELATED APPLICATION

This application is a continuation of U.S. application Ser. No. 17/242,904, filed on Apr. 28, 2021, which is a continuation of U.S. application Ser. No. 16/222,293., filed on Dec. 17, 2018, the content of which are incorporated herein by reference in its entirety. The Applicant hereby rescinds any disclaimer of claim scope in the parent application or the prosecution history thereof and advises the USPTO that the claims in this application may be broader than any claim in the parent application.

BACKGROUND

To provide reliable operation of a platform for an end-user, a platform manufacturer needs to enable the end-user to verify the authenticity of the platform. An authentication module consistent with the Trusted Platform Module (TPM) criteria conceived by Trusted Computing Group is an example security solution to detect authenticity of a platform. The TPM may be used to detect if a device of the platform is counterfeit, e.g., made by an unauthorized party or made in an unauthorized manner. The TPM may receive an instruction to authenticate each device of the platform, e.g., to check that the device is made by an authorized party in an authorized manner. During manufacturing of a device, the device manufacturer may instantiate a signed manufacturer identity in the device. Later on, the TPM may receive an instruction to verify the authenticity of the device by checking the validity of the manufacturer identity. The TPM may be implemented as a coprocessor chip that conforms with Trusted Computing Group specifications.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1A:
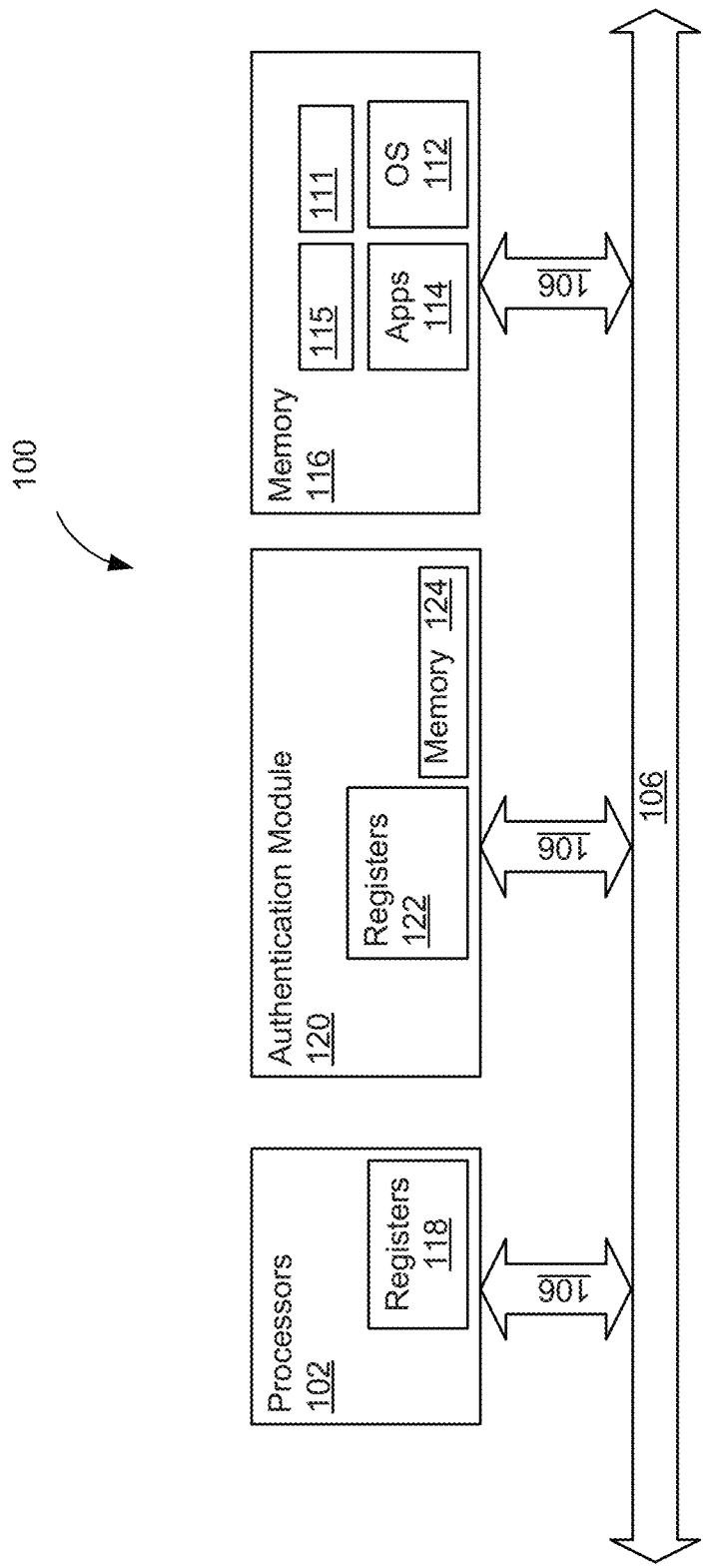
FIG. 1A illustrates a schematic diagram of an exemplary platform, according to some aspects of the disclosure.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In some embodiments, an authentication module consistent with the Trusted Platform Module criteria is used for provisioning a hardware state of a platform. The platform may include one or more processors and one or more memories that are coupled together through one or more buses and may communicated with each other and may function together through the buses. The platform may include a coprocessor that is coupled to the buses and may securely communicate with the processors and the memories. In some examples, the coprocessor that includes one or memories and one or more registers, is used for implementing. the authentication module. The authentication module may receive data corresponding to the signed manufacturer identities in one or more registers associated with the authentication module, which are the registers of the coprocessor.

Additionally, during and/or after a boot process, the authentication module may receive one or more measurements of a software stack of the platform from the processor. In some embodiments, the software stack of the platform includes one or more software elements. A first software element of the software stack of the platform may include a firmware for implementing the Unified Extensible Firmware Interface (UEFI) specification of the platform. A second software element of the software stack of the platform may include a first component of an operating system of the platform. In addition, a third software element of the software stack of the platform may include a second component of an operating system of the platform. In some examples, the software stack of the platform may comprise an ordered list of one or more software elements, which are the firmware for booting the platform and one or more components of the operating system of the platform. The software elements of the software stack may be ordered according to a time the software elements are executed, e.g., loaded into memory, during the boot process. In some embodiments, a processor of the platform may receive the one or more software elements of the software stack of the platform and implement a hash algorithm on the one or more software elements of the software stack. The processor may generate one or more measurements, e.g., perform hash operations, of the one or more software elements of software stack to generate one or more hashes of the software elements corresponding to the software stack of the platform. The processor may send the one or more hashes of the software elements to the authentication module. The authentication module may store the one or more hashes of the software elements corresponding to the software stack of the platform in one or more registers of the authentication module or in a memory of the authentication module. In some embodiments, each software element is measured, i.e., a hash algorithm is performed, and a hash of the software element is generated before the software element is executed.

As described, the software stack may include an executable code associated with a firmware of the boot process and an executable code of the processes associated with the operating system. In some examples, the software stack may include executable code of the applications. As discussed, the software stack is a time-based ordered lists of executable codes. Thus, if the operating system of the platform does not behave in a predictable manner, the software stack of the platform may change each time the platform is powered up. Therefore, if the platform has multiple processors or if a processor of the platform has multiple cores, the operating system of the platform may not behave in a predictable manner and the time-based list of the software stack, ordered according to a load time, may change between different power ups of the platform.

In some embodiments, a modified operating system may be built that behaves in a predictable manner, e.g., a deterministic manner, and thus a deterministic, e.g., predictable, software stack is generated. In some embodiments, the operating system is deterministic if the components of the operating system are loaded in the same order each time the operating system is initialized. Thus, the same software stack elements that comprises the software code of the operating system components, e.g., operating system processes, are generated. In some examples, in the modified operating system, support for multiple processors and support for multicore of each processor are disabled. Thus, the operating system is initialized on a single processor and the processes of the operating system are loaded in the same order and the same events are generated in the same order each time the operating system is initialized. In some examples, when the operating system is deterministic, if an application is loaded, the same software stack elements are generated when loading different software components of the application and the same events are generated when the application is loaded. In some embodiments, instead of creating an entropy seed by the software to initialize a random number generator of the operating system, the seed for random number generator may be acquired from the authentication module. As the result, the seed for the random number generator may not be stored and thus may not affect the hashes of the software elements stored in the authentication module.

In some examples, the software stack of the platform is deterministic and the same processes are loaded in the same order for each successive boot and the same ordered events are generated for each successive boot of the platform. A processor of the platform may implement a hash algorithm on the one or more software elements of the deterministic software stack to create the hashes of the software elements corresponding to the software stack of the platform. The processor of the platform may send the hashes of the software elements to the authentication module. The authentication module may keep the hashes of the software elements corresponding to the software stack of the platform in one or more registers of the authentication module. In some embodiments, the authentication module, when creating an object, an associated creation data is generated based on a hash of some of the measurements stored in the registers of the authentication module and the creation data is stored in a memory, e.g., a non-volatile storage, of the authentication module. Thus, the creation data may be generated by applying a hash algorithm to the one or more hashes of the software elements. In some examples, two or more of the hashes of the software elements may be combined, e.g., concatenated, and the hash algorithm is applied to the combined hashes of the software elements to generate the creation data. In some embodiments, the authentication module generates a creation hash by applying the hash algorithm on the creation data. In some examples, the object, the associated creation data, and the associated creation hash, may be stored in a memory of the authentication module. Also, when creating the object by authentication module, an associated creation ticket based on the creation hash may be generated and stored in a non-volatile memory of the authentication module. In some examples, the creation ticket is included in the object and in some examples, the creation ticket includes the creation data and the creation hash. In some examples, the object is a cryptographic key or some data that is protected by the authentication module. In some embodiments, every time a new object is created, the authentication module stores the state of the platform in a creation ticket, a creation data, and a creation hash.

In some embodiments, the authentication module may send the creation ticket, the creation data, and the creation hash to the platform. Later on, the authentication module may load a previously created object and may receive the creation ticket from the platform and may certify, e.g., validate, the creation ticket based on the creation hash that is stored in the authentication module. In some examples, the authentication module certifies that the creation ticket is generated by the authentication module. In some embodiments, the authentication module may load the object and may receive the associated creation ticket and the creation hash from the platform. Then, the authentication module may certify that the object, the creation hash, and the creation ticket are bound together and were generated by the authentication module of the platform. In some examples, the authorization module may load the creation hash in the authentication module and then certify that the object, the creation hash, and the creation ticket are bound together and are generated by the authentication module of the platform.

According to various aspects of the subject technology, a method of certifying a state of a platform includes sending, at a first instance of time, one or more first commands by a processor of the platform to an authentication module of the platform to instruct the authentication module to receive a software stack of the platform. The software stack includes one or more software elements and the software stack is uniquely determined. The one or more first commands instruct the authentication module to measure the one or more software elements of the software stack to generate one or more hashes of the software elements based on the software stack. The one or more first commands also instruct the authentication module to generate creation data, a creation hash, and a creation ticket based on the one or more hashes of the software elements and send the creation ticket to the processor. The method also includes sending the creation ticket and one or more second commands, by the processor at a second instance of time, to the authentication module, to instruct the authentication module to certify the creation data and the creation hash based on the creation ticket. The one or more second commands also instruct the authentication module to generate a certified structure based on the creation data. The one or more second commands instruct the authentication module to sign the certified structure with a signing key.

According to various aspects of the subject technology, a method of certifying a software state of a system by an authentication module of the system includes receiving, from the system, at a first instance of time, one or more first commands and a software stack of the system. The software stack includes one or more software elements. The software stack is uniquely determined. In response to receiving the one or more first commands by the authentication module, measuring the one or more software elements of the software stack to generate one or more hashes of the software elements based on the software stack. In response to receiving the one or more first commands, by the authentication module, also generating creation data, a creation hash, and a creation ticket based on the one or more hashes of the software elements and sending the creation data, the creation hash, and the creation ticket to the system. The method also includes receiving, from the system, at a second instance of time, one or more second commands, the creation ticket, the creation data, and the creation hash. In response to receiving the one or more second commands, by the authentication module, certifying the creation data and the creation hash based on the creation ticket. In response to receiving the one or more second commands, by the authentication module, also generating a certified structure based on the creation data and signing the certified structure with a signing key.

According to various aspects of the subject technology, a non-transitory machine-readable storage medium encoded with instructions executable by at least one processor of a platform is described. The machine-readable storage medium includes instructions to send, at a first instance of time, one or more first commands by the processor to an authentication module of the platform to instruct the authentication module to receive a software stack of the platform. The software stack comprises one or more software elements and the software stack is uniquely determined. The one or more first commands also instruct the authentication module to measure the one or more software elements of the software stack to generate one or more hashes of the software elements based on the software stack. The one or more first commands further instruct the authentication module to generate creation data, a creation hash, and a creation ticket based on the one or more hashes of the software elements and to send the creation data, the creation hash, and the creation ticket to the processor. The machine-readable storage medium includes instructions to send the creation ticket, the creation data, the creation hash, and one or more second commands, by the processor at a second instance of time, to the authentication module, to instruct the authentication module to certify the creation data and the creation hash based on the creation ticket. The one or more second commands also instruct the authentication module to generate a certified structure based on the creation data. The one or more second commands also instruct the authentication module to send a signature and the certified structure to the processor. In some examples, a combination of the signature and the certified structure may be named the signed certified structure.

As noted, in some embodiments, the software stack is uniquely determined because the software stack comprises the same ordered software elements each time the software stack is generated, e.g., when the platform is powered up. In some examples, the software stack is determined from the instance the platform is powered up until a point that the operating system is initialized and ready to load the applications. Then, the software stack is uniquely determined because the software stack that includes the firmware implementing UEFI specification and operating system components is the same ordered software elements each time the platform is powered up. In some examples, the software stack is determined until a point that the a predetermined application, e.g., a network communication application, is immediately loaded after the operating system is initialized. Then, the software stack that comprises the firmware implementing UEFI specification, operating system components, and components of the network communication application, is the same software stack with the same ordered software elements each time the platform is powered up until the network communication application is loaded. In some embodiments, an event log, e.g., a log of operating system events, may be generated along with the software stack and the event log may be stored in a memory of the authentication module. Thus, when support for multiprocessing and/or multicore processing is not disabled, a combination of the software stack and the event log may uniquely determine a software state of the platform. In some examples, multiprocessing and/or multicore processing may cause a change in the ordered list of the software elements of the software stack and a change in the event log between a first power up and a second power up of the platform. The event log may confirm that the change in the ordered list of the software elements of the software stack is generated due to change in the order of execution of the software components and thus the software state of the platform at the first power up and the second power up are the same. Thus, the software stack together with the event log may uniquely determine the software state of the platform.

FIG. 1A illustrates a schematic diagram of an exemplary platform, according to some aspects of the disclosure. Platform 100 of FIG. 1A may include one or more processors 102 having registers 118, authentication module 120 having registers 122 and memory 124 (e.g., non-volatile memory), and one or more memories 116 that may include non-volatile memory 115. Platform 100 also includes bus 106 that may connect to processors 102, authentication module 120, and memories 116. In some embodiments, bus 106 may comprise one or more of a data bus, a control bus, and a system bus. In some embodiments, firmware III is a firmware implementing the UEFI specification, and operating system (OS) 112 is a modified operating system that behaves in a predictable manner. Firmware 111, operating system 112, and one or more applications 114 (Apps) may execute on one of processors 102. In some embodiments, authentication module 120 is implemented as a coprocessor. Authentication module 120 is described in more details with respect to FIG. 4. In some embodiments, firmware 111 executing on processor 102 during boot process and/or operating system 112 executing on processor 102 after boot process may send a command to authentication module 120. The processor may send measurements of one or more software elements of the software stack of the platform to the authentication module. The command may instruct authentication module 120 to store the measurements of the software elements, which are the hashes of the software elements. In addition, the command may instruct authentication module 120 to create an object that is associated with the creation data, the creation hash, and the creation ticket and store the object in the non-volatile memory of the authentication module.

In some embodiments, one of applications 114 is a provisioning application that executes on processor 102. In some examples, the provisioning application is statically linked with corresponding libraries to make the provisioning application behave, e.g., execute, predictably. The provisioning application may communicate via bus 106 with authentication module 120 and may send one or more commands to authentication module 120 to instruct authentication module 120 to create an object protected by the authentication module 120 and to store the associated creation data, creation hash, and creation ticket. In some examples, registers 122 and memory 124 are non-volatile. In some embodiments, a measured boot is implemented when the platform is booted. In the measured boot, at each stage of the boot, a software element of the software stack of the next stage is determined by the processor. Then, a hash of the software element is generated by the processor and authentication module 120 is instructed by the processor to store the hash of the software element in registers 122 of authentication module 120. The measured boot is described with respect to FIG. 3A.

Figure 1B:
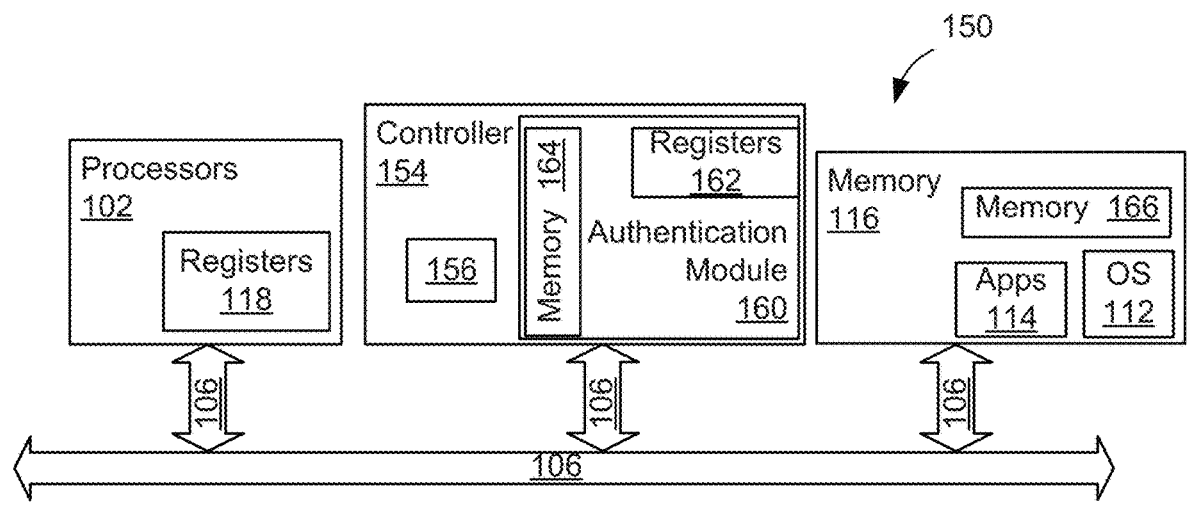
FIG. 1B illustrates a schematic diagram of an exemplary platform, according to some aspects of the disclosure.

FIG. 1B illustrates a schematic diagram of an exemplary platform, according to some aspects of the disclosure. Platform 150 of FIG. 1B includes the elements of platform 100 of FIG. 1A including one or more processors 102 and one or more memories 116. Contrary to platform 100, platform 150 does not include a coprocessor for implementing the authentication module. Instead, Platform 150 includes controller 154 that has firmware 156 that may execute on controller 154. In some examples, controller 154 also includes authentication module 160 that is consistent with authentication module 120 of FIG. 1A and may execute on controller 154. Authentication module 160 may execute on firmware 156 and/or may execute on a separate firmware of controller 154. In some examples, authentication module 160 includes registers 162 and memory 164 that are consistent with registers 122 and memory 124 of FIG. 1A. In some examples, registers 162 and memory 164 are non-volatile. In some examples, a portion of memory 116 of FIG. 1B is non-volatile memory 166.

Figure 1C:
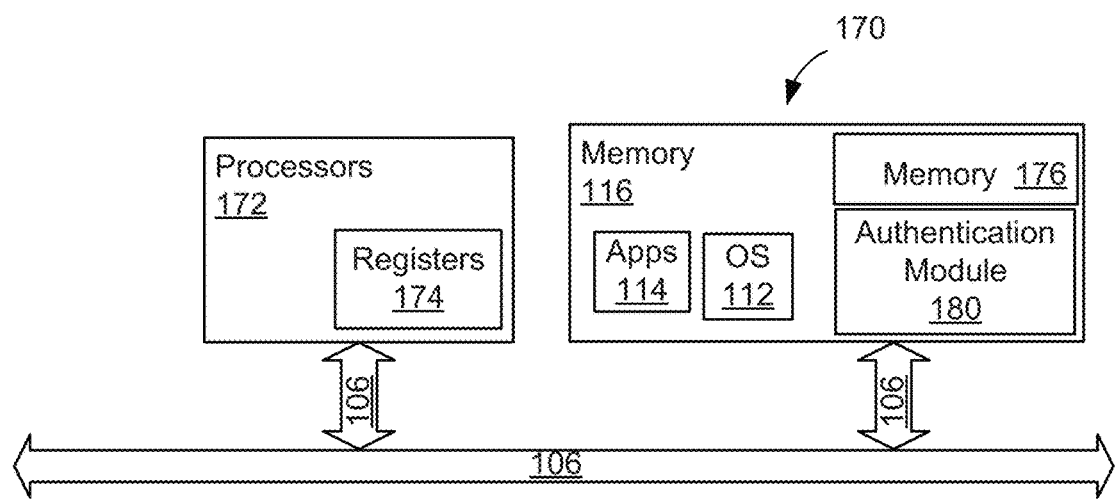
FIG. 1C illustrates a schematic diagram of an exemplary platform, according to some aspects of the disclosure.

FIG. 1C illustrates a schematic diagram of an exemplary platform, according to some aspects of the disclosure. Platform 170 of FIG. 1C includes the elements of platform 100 of FIG. 1A including one or more processors 172 and registers 174 that are consistent with processors 102 and registers 118 of FIG. 1A and one or more memories 116. Contrary to platform 100, platform 170 does not include a coprocessor for implementing the authentication module. Instead, authentication module 180 of platform 170 which is consistent with authentication module 120 of FIG. 1A is emulated on processor 172. In some examples, a portion of memory 116 of FIG 1C is non-volatile memory 176.

In some examples, authentication module 120, 160, or 180, may capture a state of platform 100, 150, or 170 that includes the software state and hardware state of the respective platform.

Figure 2:
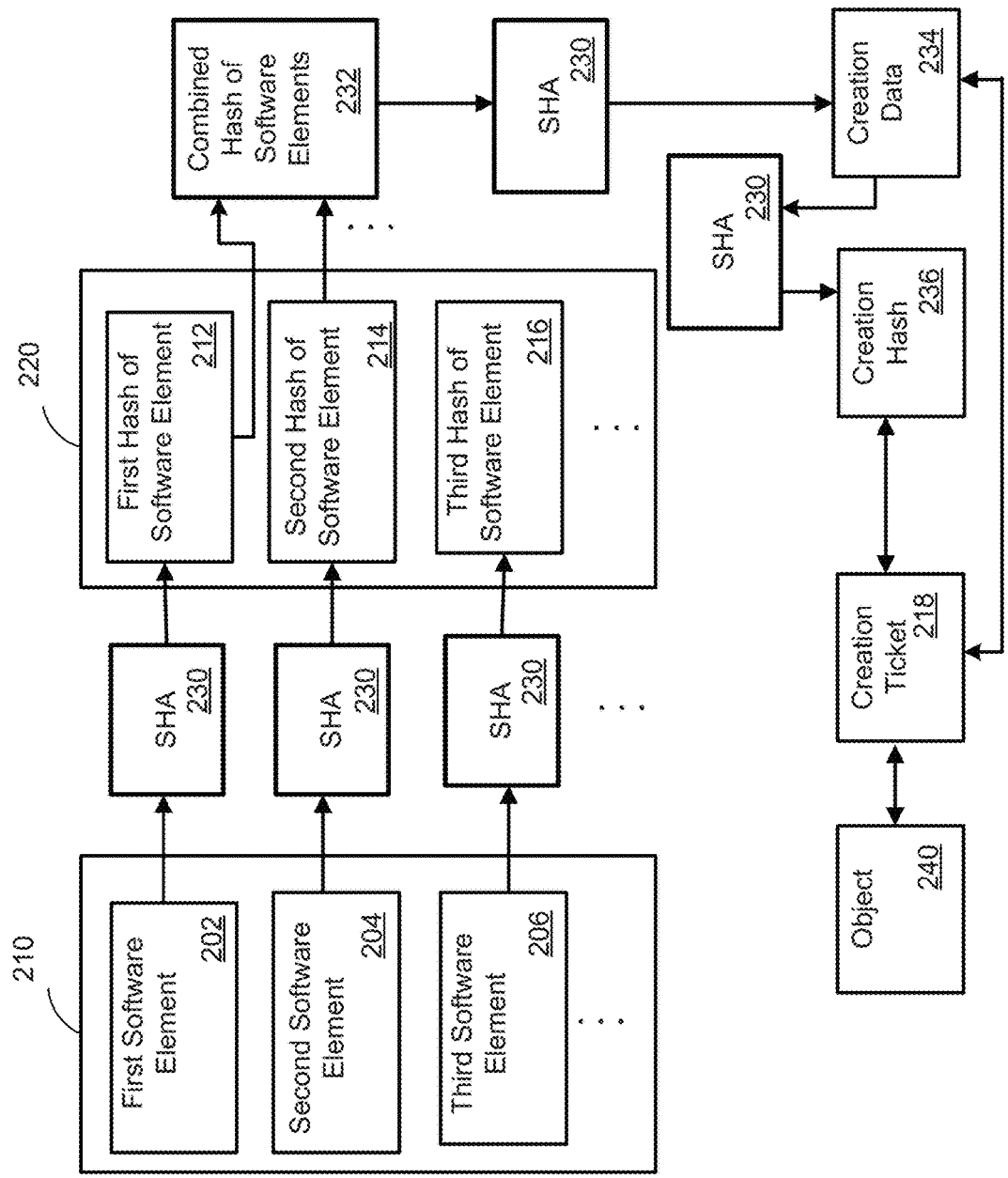
FIG. 2 illustrates an exemplary software stack, an exemplary measured software stack, and an exemplary object, according to some aspects of the disclosure.

FIG. 2 illustrates an exemplary software stack 210, an exemplary measured software stack 220, and an exemplary object 240, according to some aspects of the disclosure, As described, software stack 210 may include one or more software elements. Software stack 210 of FIG. 2 includes first software element 202, second software element 204, and third software element 206. Each software element may be a software executable code. In some examples, software element 202 is an executable code of a firmware for implementing a Unified Extensible Firmware Interface specification of a platform, e.g., platforms 100, 150, and 170 of FIGS. 1A-1C. In some examples, second software element 204 is an executable code of a first component of an operating system of the platform of FIGS. 1A-1C that is first loaded after the firmware. In some examples, third software element 206 is an executable code of a second component of the operating system of the platform of FIGS. 1A-1C that is second loaded after the firmware. In some examples, software elements of software stack 210 are listed in an order the software elements are executed after hoot up of the platform.

In some embodiments, cryptographic hash algorithm 230 is applied on software elements 202, 204, and 206, of software stack 210 and hashes of the software elements are generated. In some embodiments, cryptographic hash algorithm 230 is a module of an authentication module, e.g., authentication module 120 of FIG. 1A. In some examples, the cryptographic hash algorithm is a secure hash algorithm (SHA), which performs a measurement of software elements 202, 204, and 206, and respectively generates hashes of the software elements 212, 214 and 216. As described, processor 102 of FIG. 1A may generate software elements 202. 204, and 206, of software stack 210. In some embodiments, processor 102 may send software elements 202, 204, and 206, of software stack 210 to an authentication module, e.g., authentication module 120 of FIG. 1A. Processor 102 may instruct authentication module 120 to perform cryptographic hash algorithm 230 on software elements 202, 204, and 206, to generate hashes of the software elements 212, 214, and 216. Processor 102 may also instruct authentication module 120 to generate object 240 and creation ticket 218 and to store object 240 and creation ticket 218 in a memory or register of authentication module 120. In some embodiments, processor 102 of FIG. 1A may instruct authentication module 120, e.g., may instruct an execution engine of the authentication module, to combine the one or more hashes of the software elements 212, 214, and 216 to generate combined hash of software elements 232. In some examples, processor 102 may instruct authentication module 120 to concatenate the one or more hashes of the software elements 212, 214, and 216 to generate combined hash of software elements 232. In some embodiments, processor 102 may instruct authentication module 120 to generate creation data 234 by performing cryptographic hash algorithm 230 on combined hash of software elements 232. In addition, processor 102 may instruct authentication module 120 to generate creation hash 236 by performing cryptographic hash algorithm 230 on creation data 234. Also processor 102 may instruct authentication module 120 to generate object 240. In response and in addition to generating object 240, authentication module 120 may generate creation data 234, creation hash 236, and creation ticket 218, associated with object 240, based on hashes of the software elements 212, 214, and 216.

Alternatively, processor 102 may perform cryptographic hash algorithm 230 on software elements 202, 204, and 206, to generate hashes of the software elements 212, 214. Processor 102 may send hashes of the software elements 212, 214 to authentication module 120 and may instruct authentication module 120 to store the hashes of the software elements in memory or register of authentication module 120. As described, processor 102 may instruct authentication module 120 to generate object 240 associated with and based on hashes of the software elements of measured software stack 220. Also, processor 102 may instruct authentication module 120 to store object 240 including creation data 234, creation hash 236, and creation ticket 218, in a memory of authentication module 120. In some examples, one or more data items such as a user-provided data item, e.g., a nonce, may be incorporated into creation data 234 and then, based on creation data 234, creation hash 236 and creation ticket 218 are generated. As described, when object 240 is created by authentication module 120, an associated creation ticket, e.g., creation ticket 218 is also created by authentication module 120. In some examples, creation ticket 218, creation data 234, and creation hash 236, are part of object 240 and in some examples, creation ticket 218, creation data 234, and creation hash 236, although are associated with, e.g., are bound with, object 240, but may not be part of object 240. In some embodiments, in addition to the hash of combined hash of software elements 232, creation data 234 comprises one or more data items that are incorporated into creation data 234 in a data structure format. Then, creation hash 236 is generated by performing a secure hash algorithm of creation data 234 that includes the one or more data items. Adding data items to creation data and generating creation hash 236 and creation ticket 218 based on creation data 234 is described with respect to FIG. 5.

Figure 3A:
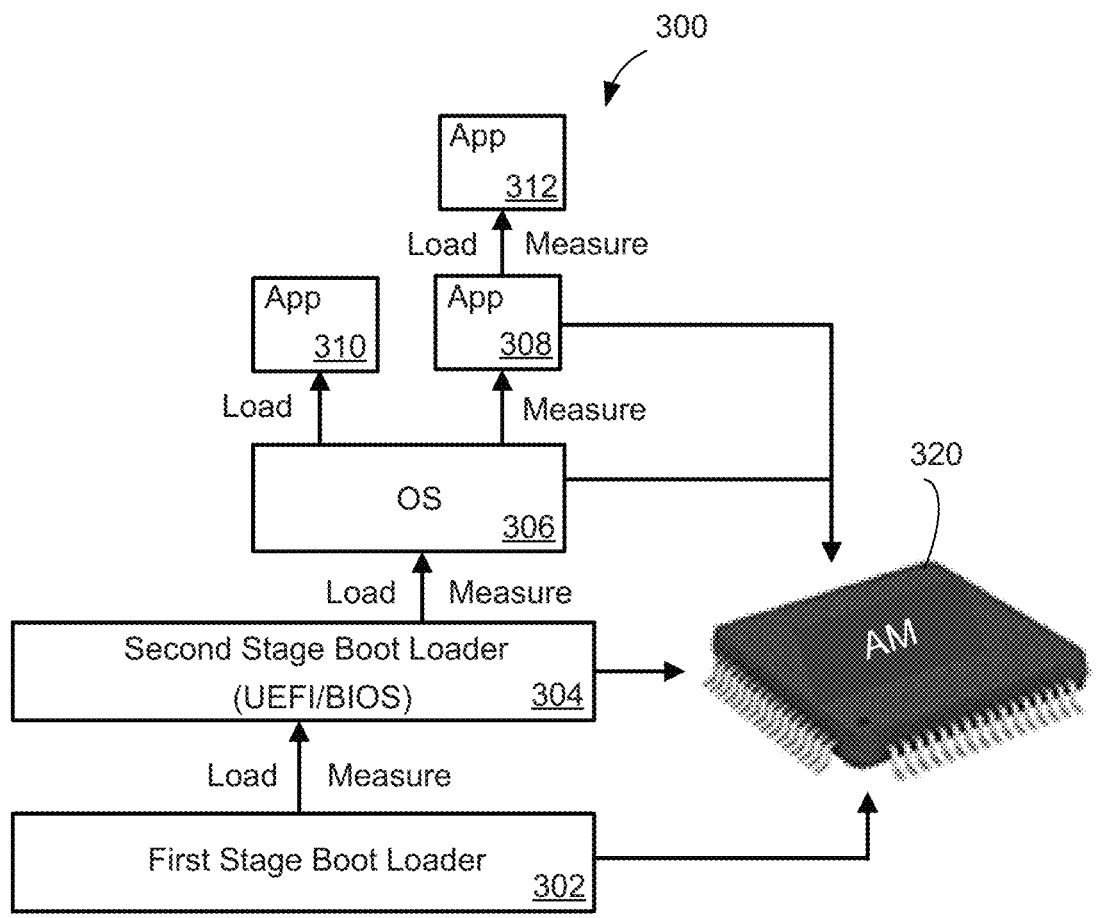
FIG. 3A illustrates a flow diagram of an exemplary process for a measured boot of a platform, according to some aspects of the disclosure.

FIG. 3A illustrates a flow diagram of an exemplary process 300 for a measured boot of a platform, according to some aspects of the disclosure. Process 300 begins at step 302, where a first stage boot loader is loaded. In some embodiments, processor 102 of FIG. 1A may load the first stage boot loader and may execute the first stage boot loader. In some embodiments, the first stage boot loader is a secure code, e.g., physically stored in a hardware chip, and may not be modified. Thus, in some examples, the first stage boot loader is a core root of trust for measurements and the measurement, e.g., performing the hash algorithm, of software stack may be performed by the first stage boot loader.

At step 304, the first stage boot loader may load a second stage boot loader. Before loading, e.g., executing, the second stage boot loader, the first stage boot loader may measure the second stage boot loader. Thus, in some embodiments, an executable code of the second stage boot loader is the first software element 202 of software stack 210 of FIG. 2. In some examples, the first stage boot loader performs a measurement, e.g., performs a cryptographic hash algorithm, on the executable code of the second stage boot loader and generates first hash of software element 212. In some examples, the physically stored first stage boot loader is the first software element 202 and the second stage boot loader is the second software element 204. In some examples, there is no code running at a time the first stage boot loader is loaded. Thus, a measurement (e.g., a cryptographic hash) of the first stage boot loader, which is first hash of software element 212, is also physically stored in a hardware chip. In some embodiments, the first stage boot loader retrieves the first hash of software element 212 from the hardware chip and sends the first hash of software element 212 to authentication module 320 to be stored in a first register of authentication module 320. Then, the first stage boot loader performs a cryptographic hash algorithm on the executable code of the second stage boot loader and generates second hash of software element 214. The first stage boot loader may send second hash of software element 214 to authentication module 320 to be stored in a second register of authentication module 320.

At step 306, the first stage boot loader may load an operating system (OS) of a platform, e.g., platform 100 of FIG. 1A. Before loading, e.g., executing, the operating system, the first stage boot loader may measure, e.g., perform a cryptographic hash of, the operating system. Thus, in some embodiments, a executable code of the operating system 112, e.g., the OS of FIGS. 1A-1C, is the third software element 206 of software stack 210 of FIG. 2 and a cryptographic hash of the operating system is third hash of software element 216 of FIG. 2. The first stage boot loader may send third hash of software element 216 to authentication module 320 to be stored in a third register of authentication module 320. In some embodiments, third software element 206 is an executable code of a first component of the operating system and executable codes of other components of the operating system according to a loading order creates other software elements of software stack 210.

At steps 308, 310, and 312, software applications may be loaded by the operating system or by other software applications. Similarly, before loading an application, the application may be measured. Thus, the executable code of the applications, according to a loading order, generates other software elements of software stack 210 and measurements (a cryptographic hashes) of the executable code of the applications generate other hashes of the software elements that may be sent to other registers of authentication module 320.

Figure 3B:
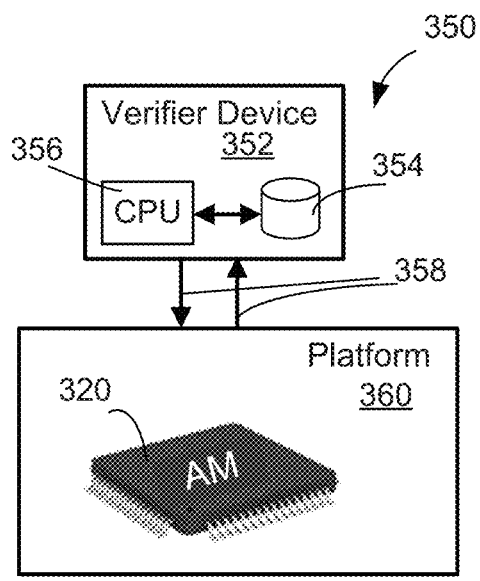
FIG. 3B illustrates a schematic diagram of an exemplary system for performing a verification of a platform, according to some aspects of the disclosure.

FIG. 3B illustrates a schematic diagram of an exemplary system 350 for performing a verification of a platform, according to some aspects of the disclosure. The steps of performing the verification is described with respect to process 800 of FIG. 8. In some embodiments, CPU 356 of verifier device 352, external to platform 360, may send a request, via communication interface 358, to platform 360 to request a signed certified structure. The communication interface 358 may be hard wired, wirelessly connected, or optically connected. Platform 360 is consistent with platforms 100, 150, and 170, of FIGS. 1A-1C. The request may include a special code, a nonce as an input of signature request. In some examples, verifier device 352 may send user provided data 504 and/or 520 of certified structure 500 of FIG. 5 to authentication module 320 of platform 360 when requesting the signed certified structure. CPU 356 may receive the signed certified structure via communication interface 358. Verifier device 352 may use a public key to verify the signature of the signed certified structure and to verify the certified structure is authentic and is sent by authentication module 320. CPU 356 may compare the certified structure with a previously received authentic signed certified structure from memory 354 and if they match CPU 356 may verify the signature and certified structure are generated by the same platform and the platform is intact. In some embodiments, the signature is associated with some data (e.g., a certified structure and a nonce). To create the signature, the data, e.g., the certified structure and the nonce, is hashed and then the hash is signed (encrypted) into the signature using a signing key where the signing key is a private key of an asymmetric public/private key pair.

Figure 4:
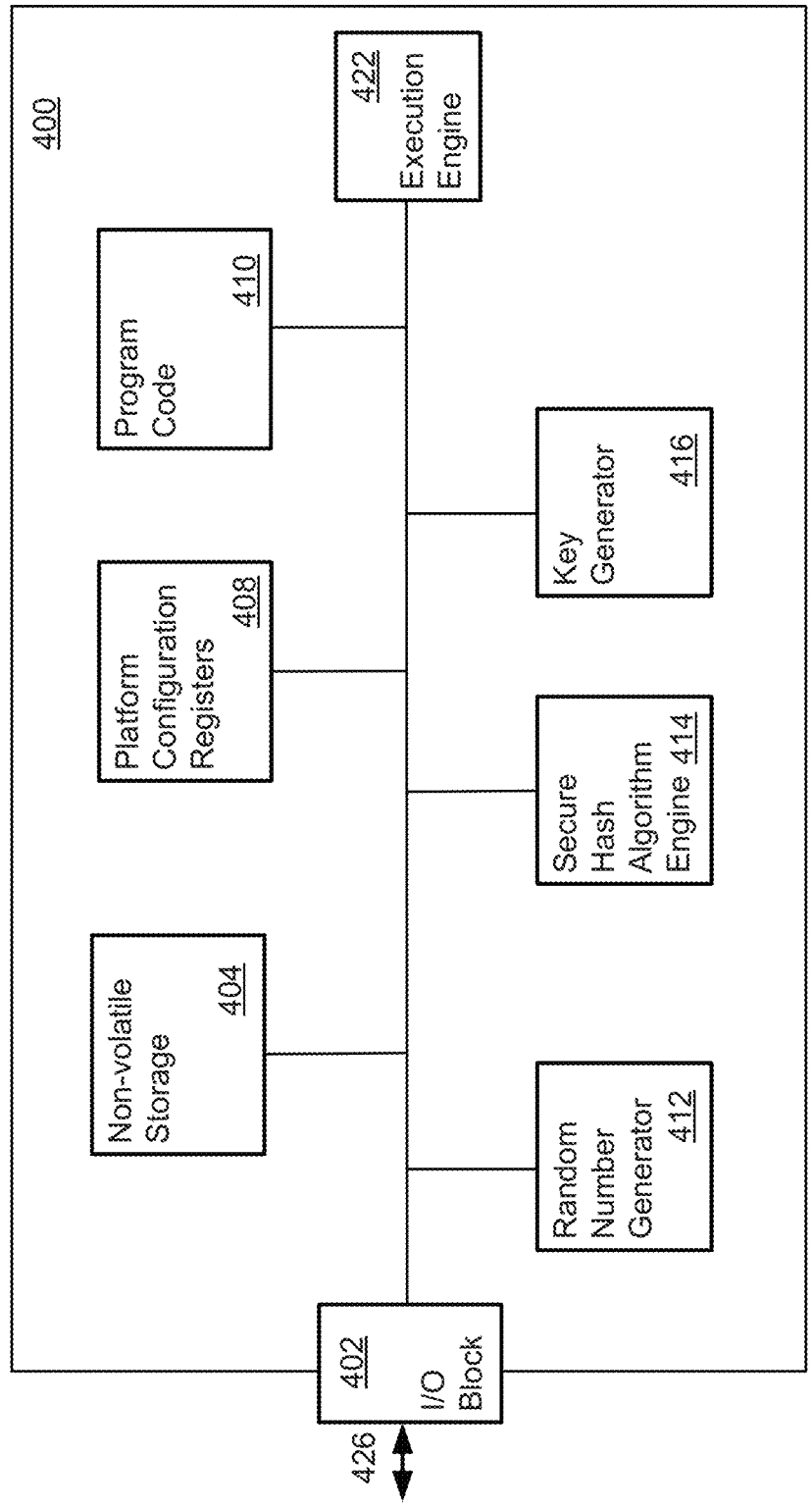
FIG. 4 illustrates a schematic diagram of an exemplary authentication module, according to some aspects of the disclosure.

FIG. 4 illustrates a schematic diagram of an exemplary authentication module, according to some aspects of the disclosure. In some embodiments, authentication module 400 of FIG. 4 is consistent with the Trusted Platform Module criteria of Trusted Computing Group and includes a number of sub-modules. As described, authentication module 400 may be executed as a coprocessor as shown in FIG. 1A. Thus, the sub-modules of authentication module 400 may communicate to memory and registers of authentication module 400, which are the memory and registers of the coprocessor, via internal buses of the coprocessor. Additionally, authentication module 400 may communicate to processor 102 and memory 116 through bus 106 of FIG. 1A.

Authentication module 400 includes one or more platform configuration registers 408 that each one can store one or more bytes of data. In some examples, the hashes of the software elements of the platform is stored in one or more registers of platform configuration registers 408. The hashes of the software elements stored in the platform configuration registers may be measures of the integrity of code from UEFI to operating system to applications. As described, hashes of the software elements are generated before the code is executed. In some embodiments, platform configuration registers 408 values are reset when the platform is powered down or restarts to make certain old hashes of the software elements do not remain in platform configuration registers 408. In some examples, after each power up or restart, new hashes of the software elements are stored in platform configuration registers 408.

Authentication module 400 also includes non-volatile storage 404 and program code 410. In some embodiments, non-volatile memory 124 of authentication module 120 is consistent with non-volatile storage 404. Non-volatile storage 404 may be used to store long term keys and program code 410. Authentication module 400 further includes execution engine 422 and I/O block 402. Execution engine 422 may execute program code 410. By executing program code 410, execution engine 422 may respond to external commands that are received through I/O block 402 and may respond through I/O block 402. In some embodiments, I/O block 402 of authentication module 400 is coupled to bus 426 which is consistent with bus 106 of FIGS. 1A-1C.

Authentication module 400 further includes random number generator 412, secure hash algorithm engine 414, and key generator 416. Secure hash algorithm engine 414 may receive input data through I/O block 402 and may produce hashed data, e.g., a digest, that can be stored in one or more of platform configuration registers 408. Key generator 416 may generate key that are consistent with the RSA or ECC algorithm. The keys can be used for signing and for secure storage. For example, when data is transferred via I/O block 402 outside authentication module 400, the data max be signed by a key. In some examples, a private key is used to sign the data and then the signed data and an associated public key is transferred outside authentication module 400. A user of data may use the public key to verify that the signed data is authentic and is sent by an intended sender. In some examples, secure hash algorithm engine 414 performs the cryptographic hash.

In some embodiments, authentication module 120 of FIG 1A is consistent with authentication module 400 and registers 122 and memory 124 of authentication module are consistent with platform configuration registers 408 and non-volatile storage 404. In some embodiments, authentication module 160 of FIG. 1B is consistent with authentication module 400 and registers 162 and memory 164 of authentication module 160 are consistent with platform configuration registers 408 and non-volatile storage 404. In some embodiments, an emulation of authentication module 180 of FIG. 1C that may execute on processor 172 is consistent with authentication module 400. In addition, registers 174 and memory 176 of FIG. 1C may be used as platform configuration registers 408 and non-volatile storage 404. In some examples, platform configuration registers 408 and non-volatile storage 404 are tamper proof, e.g., software tamper proof. In some embodiments, the authentication module performs operations and/or responds based on one or more commands it receives through I/O block 402. In some examples, authentication module 400 may generate a certified structure as shown in FIG. 5 and may send it out of authentication module 400, e.g., may send it to processor 102.

As described, processor 102 of FIG. 1A, e.g., the provisioning application running on processor 102 may generate the software stack of platform 100 and may perform a hash algorithm on software elements 202, 204, and 206, of the software stack of platform 100 to generate hashes of the software elements 212, 214, and 216 as shown in FIG. 2. Then, processor 102 may send hashes of the software elements 212, 214, 216, to authentication module 120 and may instruct authentication module 120 to store hashes of the software elements 212, 214, and 216. Also, processor 102 may instruct authentication module 120 to generate object 240 that is associated with creation data 234 and creation hash 236 and may further include creation ticket 218, based on hashes of the software elements 212, 214, and 216. Alternatively, processor 102 may send software elements of the software stack of platform 100 to authentication module 120 and may instruct authentication module 120 to generate hashes of the software elements 212, 214, and 216, and to generate creation ticket 218 and to store the hashes of the software elements and the creation ticket.

Figure 5:
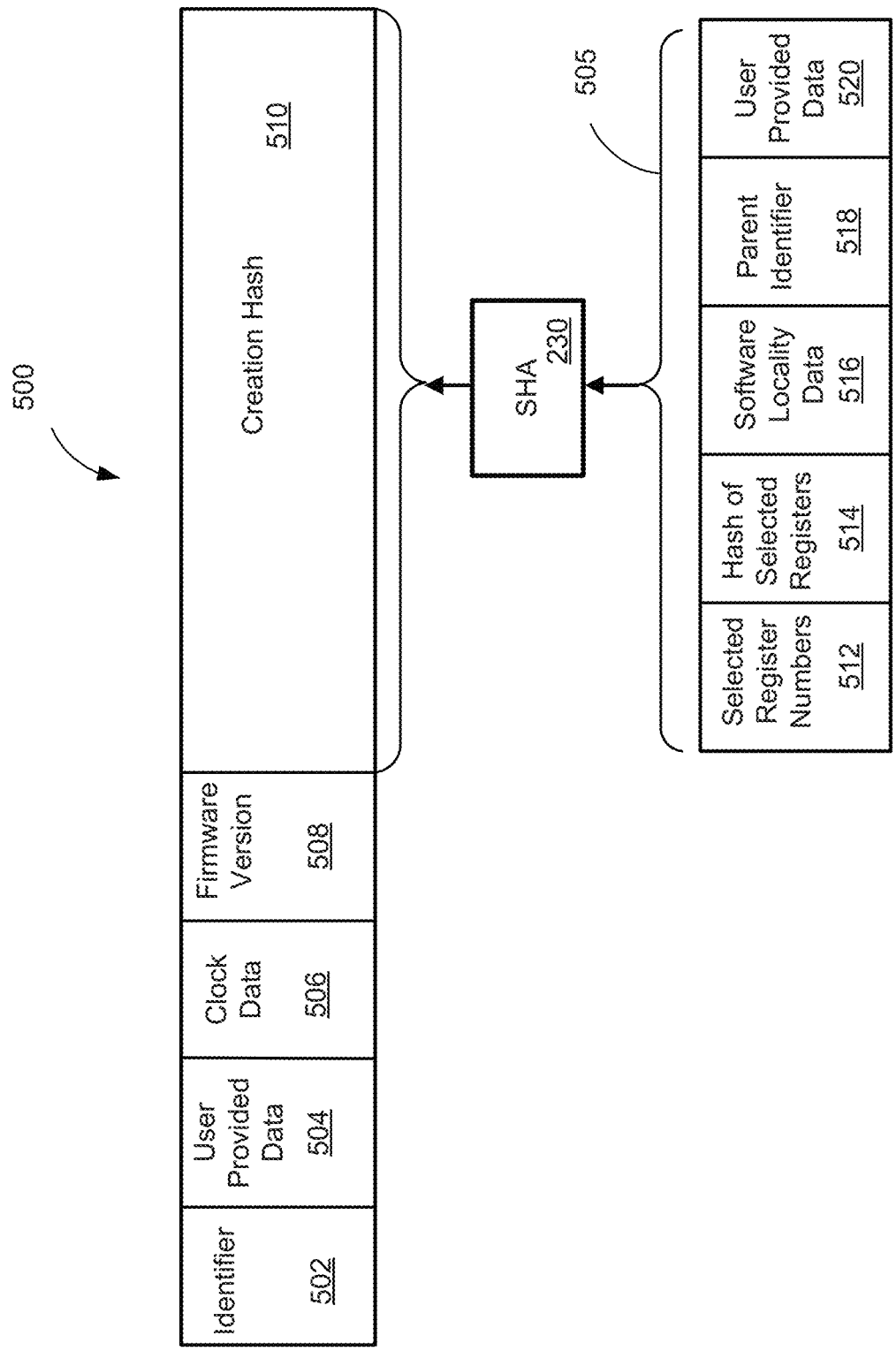
FIG. 5 illustrates an exemplary certified structure generated by the authentication module, according to some aspects of the disclosure.

FIG. 5 illustrates an exemplary certified structure generated by the authentication module, according to some aspects of the disclosure. As described, authentication module 400 of FIG. 4 or authentication modules 120, 160, or 180 of FIGS. 1, 1B, and 1C may create certified structure 500 of FIG. 5. In some embodiments, execution engine 422 of FIG. 4 may use a private key generated by key generator 416 to sign certified structure 500 and then transfer the signature of the certified structure via I/O block 402. Returning back to FIG. 1A, the signature of the certified structure may be transferred via bus 106 to processor 102 and processor 102 may store the signature of the certified structure in a memory, e.g., a non-volatile memory 115. In some examples, key generator 416 or a separate unit (not shown) of authentication module 400 also generates a cryptographic key that is used by execution engine 422 to secure a transmission between the authentication module and the platform.

Certified structure 500 of FIG. 5 includes identifier 502, user provided data 504, clock data 506, firmware version 508, and creation hash 510. In some embodiments and referring back to authentication module 400, firmware version 508 is a version number of program code 410 that is executed by execution engine 422. Data 504 is a user provided data such as a nonce, for example, a number or alphanumeric string, to increase entropy and/or to add freshness to the certified structure that may make a current certified structure different from a previous certified structure. Clock data 506 is clock information of authentication module 400, e.g., the clock information of the processor, coprocessor, or controller, that implements authentication module 400. Clock data 506 includes a time stamp when the certified structure is created, a number of times the authentication module is reset or restarted, and a flag, e.g., a true or false flag. The flag may indicate if the clock is modified, e.g., deliberately modified. Identifier 502 is an identifier, e.g., a hash of the public key, associated with the private key where the private key is a signing key used to sign certified structure 500. In some embodiments, the public key may be signed by a manufacturer's identity, either the identity of a manufacturer of authentication module 120, 160, 180, or 400, or the identity of a manufacturer of the platform, e.g., platforms 100, 150, or 170.

The certified structure 500 further includes creation hash 510. Creation hash 510 may be generated by performing a hash algorithm, e.g., hash algorithm 230 of FIG. 2, on creation data 505. Creation data 505 may comprise hash of selected registers 514, which is consistent with creation data 234 of FIG. 2. Flash of selected registers 514 is a hash of a concatenation of selected registers, where the selected registers are defined by selected register numbers 512. Creation data 505 may further include one or more data items that comprise selected register numbers 512, software locality data 516, parent identifier 518, and user provided data 520. In some embodiments, selected platform configuration register numbers 512 is a list of platform configuration registers, e.g., a list of platform configuration register numbers such as one, two, and three, when platform configuration registers 1-3 are used for creating hash of selected registers 514. As noted, hash or selected registers 514 is a combination, e.g., concatenation, of the data in the platform configuration registers identified in selected register numbers 512 that is then hashed by a secure hash algorithm, e.g., by secure hash algorithm engine 414 of authentication module 400. In some examples, software locality data 516 is a number between zero and 255, with zero being UEFI layer, one being operating system layer, and two or more being application layers. As described, the provisioning application may command the authentication module, e.g., authentication module 120 or 400, to create object 240 of FIG. 2 based on the hashes of the software elements that are in the one or more platform configuration registers. Additionally, the provisioning application may send creation ticket 218 to authentication module and command the authentication module to certify object 240 and then create certified structure 500 based on creation data 234 and creation hash 236 associated with object 240. Software locality data 516 may indicate in which layer the provisioning application was executing when instructed authentication module 120 or 400 to create creation ticket 218. In some examples, the provisioning application may execute on modified operating system 112 and thus software locality may be two or more. Parent identifier 518 is a digest of the parent of the public key, e.g., a hash of the public key of the parent. In addition, user provided data 520 is similar to user provided data 504 that is a user provided data such as a nonce. In some embodiments, authentication module 120, 160, 180, or 400 of FIGS. 1A, 1B, 1C, or 4, may perform a hash operation on certified structure 500. In some embodiments, authentication module 120, 160, 180, or 400 may sign certified structure 500 by a signature. The signature and the certified structure 500 may be sent to processor 102 of platform 100 and processor 102 may store the signature and the certified structure 500 or may transfer it outside platform 100. In some embodiments, every time a new object 240 is created, the authentication module, e.g., authentication module 120, stores the state of the platform, based on the data in selected register numbers 512, in a creation ticket 218, creation data 234, creation hash 236.

Figure 6:
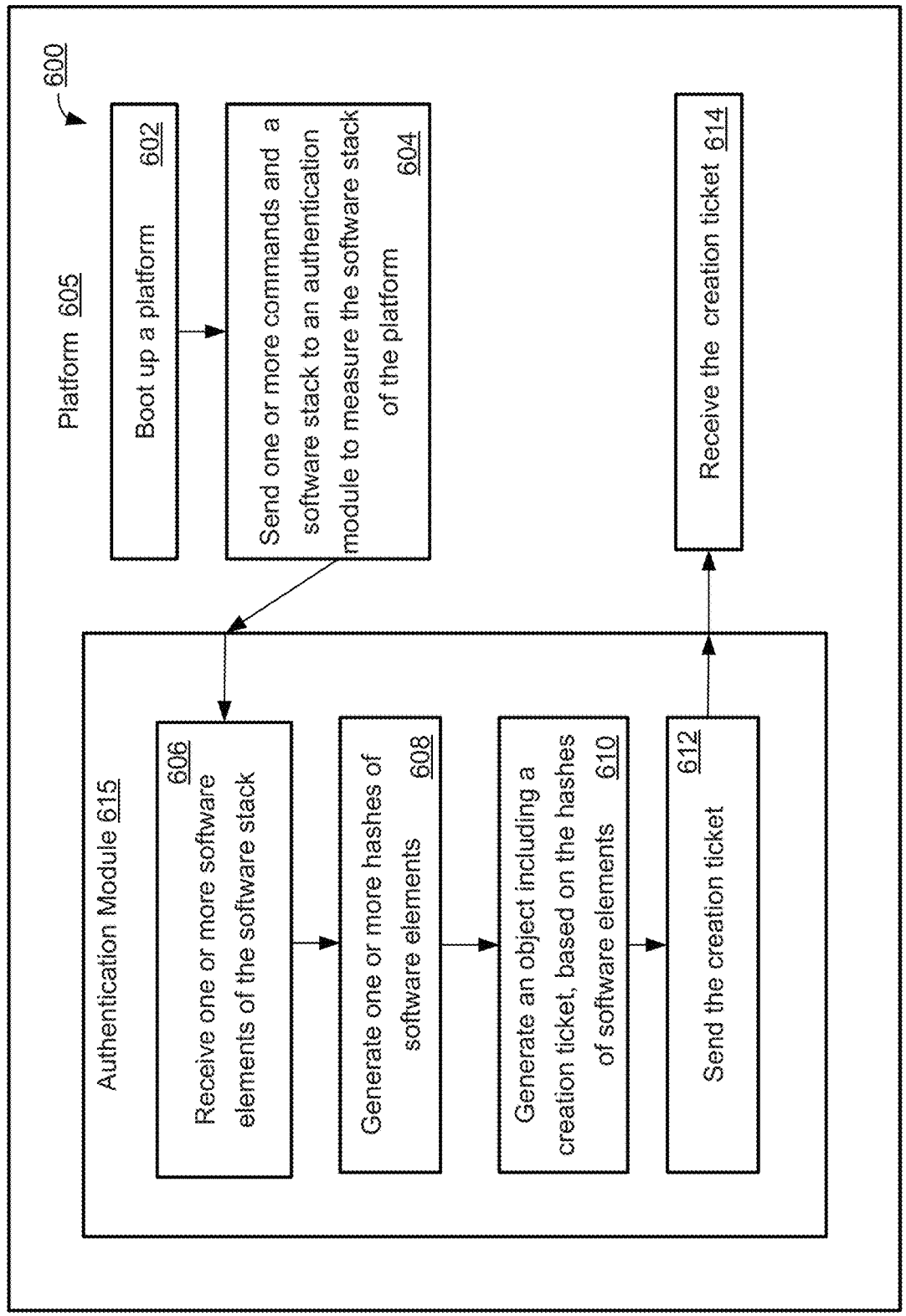
FIG. 6 illustrates a flow diagram of an exemplary process for provisioning a state of a platform, according to some aspects of the disclosure.

FIG. 6 illustrates a flow diagram of an exemplary process for provisioning a state of a platform, according to some aspects of the disclosure. Process 600 may be used for provisioning the state of system such as platforms 100, 150, or 170 of FIGS. 1A-1C. Notably, one or more steps of process 600 described herein may be omitted, performed in a different sequence, and/or combined with other processes for various types of applications contemplated herein. Process 600 can be performed by the processor and the authentication module of FIGS. 1A-1C, to capture the state of the platform and to generate and provide a creation ticket corresponding to the captured state.

Process 600 begins at step 602, where a platform is booted up. In some examples, platform 100, 150, or 170, is booted up by powering up processor 102 or 172. In some embodiments, processor 102 or 172 may execute firmware 111 implementing the UEFI specification and execute the modified operating system 112 in a predictable, e.g., deterministic, manner to boot up the platform. In some examples, a measured boot as described in FIG. 3A may be implemented to boot up platforms 100, 150, and 170.

In step 604, one or more commands and a software stack are sent to an authentication module to measure the software stack of the platform. In some examples, measuring the software stack of the platform include performing a hash algorithm on software elements of the software slack. The software stack is consistent with software stack 210 of FIG. 2 and the software elements are consistent with software elements 202, 204, and 206 of FIG. 2. Steps 602 and 604 may be executed by a processor of platform 605 which are consistent with processors 102 and 172 of platforms 100, 150, and 170. Thus, the software stack may be created by processor 102 and the one or more commands and the software stack may be transmitted by processor 102. The software stack is described in more details with respect to FIG. 2.

In step 606, one or more software elements of the software stack are received by authentication module 615, which is consistent with authentication modules 120, 160, 180, and 400 of FIGS. 1A-1C and 4. In some examples, a state of a platform includes a hardware state and a software state of the platform. The hardware state may be determined based on signed manufacturer identities of processor 102 or 172 and memory 116 of FIGS. 1A-1C. In some examples, the hardware state of platform 100 may be determined based on a signed manufacturer identity of authentication module 120, the coprocessor. The software state may be determined based on the software stack of the platform that may comprise an ordered list of software elements that may include the firmware implementing UEFI specification, operating system components, and one or more applications. In some examples, the software stack may also comprise an ordered list of firmware of the hardware modules of platform 100 (not shown). In some embodiments, a software stack, e.g., software stack 210 of FIG. 2, is generated by a processor of a platform, e.g., by processor 102 of platform 100 of FIG. 1A, and the software stack is sent to authentication module 120 of FIG. 1A. In some embodiments, the operating system of the platform may be modified to an operating system such that the software stack is uniquely determined and the software elements may be uniquely determined for each boot up. In some examples, the processes of the operating system of the platform may be loaded in a unique and deterministic order and the hardware modules may be initialized in a unique and deterministic order. In some embodiments, after boot up, the modified operating system is replaced with the operating system of the platform.

In step 608, one or more hashes of the software elements are generated. The hashes of the software elements may be generated by authentication module 615 via performing a hash algorithm on the software elements of the received software stack. In some examples, the software stack may be hashed by secure hash algorithm engine 414 of authentication module 400 to produce the hashes of the software elements. The hashes of the software elements may be stored in registers associated with authentication module 400. In some examples, the hash algorithm may be performed by a processor, e.g., processor 102 of FIG. 1A, of platform 100 and hashes of the software elements 212, 214, and 216 may be generated by processor 102. Then processor 102 may send hashes of the software elements 212, 214, and 216 to authentication module 120 to be stored.

In step 610, based on the hashes of the software elements, an object and a creation ticket associated with the object is generated. In some examples, a first command of the one or more commands at step 604 corresponds to measuring the software stack of the platform arid generating the hashes of the software elements. In some examples, a second command of the one or more commands at step 604 corresponds to creating an object based on the hashes of the software elements. Processor 102 of FIG. 2 may send the second command after the hashes of the software elements are generated and they are in platform configuration registers of authentication module 615. In some embodiments, and referring back to FIGS. 1A-1C, authentication modules 120, 160, or 180 may generate an object consistent with object 240 of FIG. 2 and based on hashes of the software elements 212, 214, and 216. As described, object 240 may be associated with creation data 234 and creation hash 236. Authentication modules 120, 160, or 180 may also generate a creation ticket, consistent with creation ticket 218 of FIG. 2, that is associated with object 240. The generation of object 240 and creation ticket 218 is described with respect to FIG. 2. As described with respect to FIG. 2, a user-provided data, e.g., a nonce, may be combined to the hashes of the software elements when generating object 240 and creation ticket 218.

In step 612, the creation ticket is sent. In some examples, the generated creation ticket is sent via I/O block 402 to a processor of the platform, e.g., processors 102 or 172, of platforms 100, 150, or 170. In some examples, in addition to sending a creation ticket consistent with creation ticket 218 of FIG. 2, creation data 234 and creation hash 236 corresponding to creation ticket 218 is also sent by authentication module 615 to the platform 605. In some embodiments, steps 606, 608, 610, and 612 are implemented by authentication module 615 which is consistent with authentication modules 120, 160, 180, and 400 of FIGS. 1A-1C and 4.

In step 614, the creation ticket is received. In some examples, the creation ticket is received by the processor of platform 605, which is consistent with platforms 100, 150, and 170. Creation ticket 218 may be received via I/O block 402 of the authentication module by the processor of the platform. The creation ticket may be stored, e.g., is a secure memory, in the platform for later use. In some examples, creation ticket 218 of FIG. 2 may be transferred out of a platform, e.g., out of platform 100, 150, or 170 of FIGS. 1A-1C.

Figure 7:
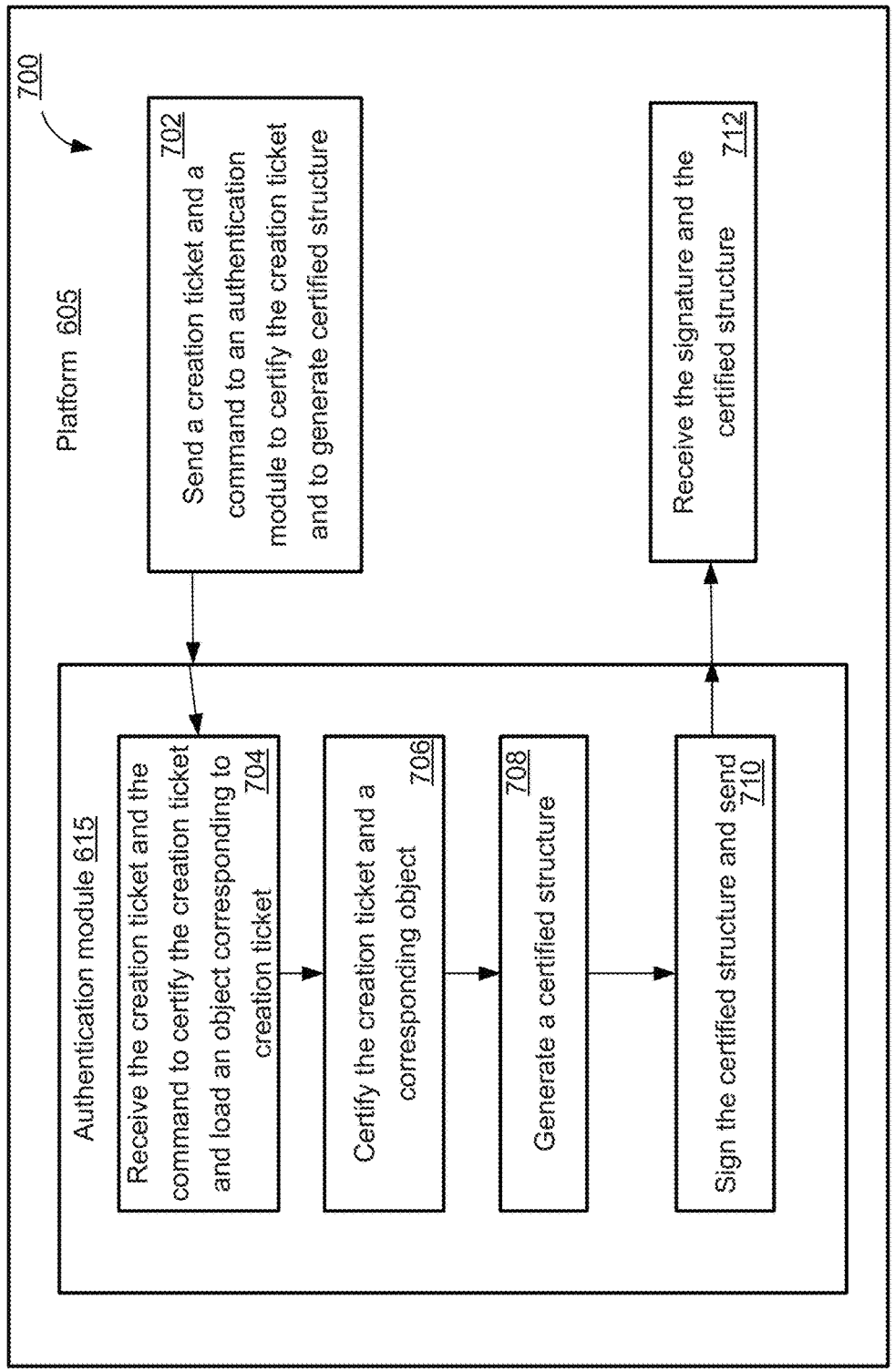
FIG. 7 illustrates a flow diagram of an exemplary process for certifying a state of a platform, according to some aspects of the disclosure.

FIG. 7 illustrates a flow diagram of an exemplary process for certifying a state of a platform and generating a certified structure, according to some aspects of the disclosure. Process 700 may be used for certifying the state of a system such as platform 100, 150, or 170 of FIGS. 1A-1C. Notably, one or more steps of process 700 described herein may be omitted, performed in a different sequence, and/or combined with other processes for various types of applications contemplated herein. Process 700 can be performed by the processor, the authentication module, or the controller of FIGS. 1A-1C, to certify the state of platform 100, 150, or 170 and to provide a certified structure.

Process 700 begins at step 702, where a creation ticket and a command to certify the creation ticket and to generate a certified structure is sent to an authentication module. As described, a creation ticket such as creation ticket 218 of FIG. 2 may be received by a processor of platform 605, which is consistent with processor 102 of platforms 100 and 150, from authentication module 615, which is consistent with authentication modules 120, 160, 180, and 400. Creation ticket 218 may be saved in a memory of the platform. Later on, creation ticket 218 may be sent back via a processor of platform 605, which is consistent with processor 102 of platform 100, to authentication module 615. In some examples, the authentication module of the platform verifies that creation ticket 218 is in fact generated by the same authentication module for the same platform, in some examples, the processor of platform 605 sends creation ticket 218, creation hash 236, and a nonce provided by a user when generating creation ticket 218, to platform 605. In some examples, the command includes generating a certified structure by an authentication module based on an object, e.g., object 240 of FIG. 2, and the associated creation data 234 and creation hash 236. The certified structure is described with respect to FIG. 5.

In step 704, the creation ticket and the command to certify the creation ticket is received and then the object associated with the creation ticket is loaded. In some examples and referring to FIG. 2, after receiving creation ticket 218, object 240 that is associated with creation hash 236 and creation data 234 is loaded. Authentication module 615 may receive creation ticket 218 from a processor of the platform 605 along with a command to certify the creation ticket. Creation ticket 218 may be received via I/O block 402 of authentication module 400 of FIG. 4 from a processor of platform 605 which is consistent with processor 102 of platform 100 of FIG. 1A. As noted creation ticket 218, may be created based on creation hash 236. In some embodiments, the certification of creation ticket 218 is based on creation hash 236. In some examples, the authentication module, e.g., authentication module 120, 160, 180, or 400, loads creation hash 236 and creation data 234 that are associated with object 240 and is also associated with creation ticket 218, from the a secure memory of the authentication module, e.g., non-volatile storage 404 of FIG. 4, to a memory of the authentication module. Then the authentication module certifies creation ticket 218 based on the loaded creation hash 236. In some other examples, the authentication module, e.g., authentication module 120, 160, 180, or 400, receives creation ticket 218, creation data 234, and creation hash 236, from a processor, e.g., processor 102 of platform 100 of FIG. 1A, and loads the received creation data 234 and creation hash 236 to a memory of the authentication module. Then the authentication module certifies creation ticket 218 based on the loaded creation hash 236.

In step 706, the creation ticket and a corresponding object are certified. The authentication module 615 may certify the received creation ticket, e.g., creation ticket 218. In some examples, authentication module 120 of platform 100 certifies that creation ticket 218 and the associated object 240 loaded in step 704 are in fact generated by the same authentication module 120 for the same platform 100. If creation hash 236 is received from the platform, authentication module 120 of platform 100 may also certify that the received creation ticket 218, the received creation hash 236, and the associated object 240, are bound to each other and are generated by the same authentication module 120 for the same platform 100.

In step 708, a certified structure is generated. In some embodiments, after receiving the command from the platform and after certifying the received creation ticket, an authentication module, e.g., authentication module 120 of platform 100 of FIG. 1A, generates a certified structure, e.g., certified structure 500 of FIG. 5. In some examples, the generated certified structure 500 corresponds to the received creation ticket 218 and creation hash 510. As described, the command to generate certified structure 500 may be included with the command to certify the creation ticket in step 704. Authentication module 120 may receive the command through bus 106 and via an I/O block consistent with I/O block 402 of FIG. 4.

In some embodiments, creation ticket 218 may include creation hash 510, however, creation ticket 218 may be decoded by the authentication module 120 to certify creation ticket 218 corresponds to the creation hash 510 in the memory of authentication module 120.

In step 710, the certified structure is signed and sent. In some embodiments, an execution engine of authentication module 615, which is consistent with execution engine 422 of FIG. 4, may use a private key (signing key) generated by a key generator consistent with key generator 416 of FIG. 4. Execution engine 422 may sign the certified structure 500 or may concatenate some data, e.g., a nonce, and then sign the hash of the concatenated certified structure and the hash to create the signature. In some embodiments, the authentication module 615 may send the signature and the certified structure via I/O block 402 to the platform. In some examples, the signature is verifiable by a public key associated with the private key (signing key) used for creating the signature. In some examples, the public/private key pair is generated by an authentication module, e.g., authentication module 120 of FIG. 1 in response to a request, e.g., instruction, from processor 102. In some embodiments, the signed certified structure comprises the signature and the certified structure.

In step 712, the signature and the certified structure are received. In some embodiments, the signature and the certified structure are received by a processor of platform 100, 150, or 170 from an authentication module of the platform that is consistent with authentication module 615. The signature and the certified structure may be transferred to an entity external to the platform.

Figure 8:
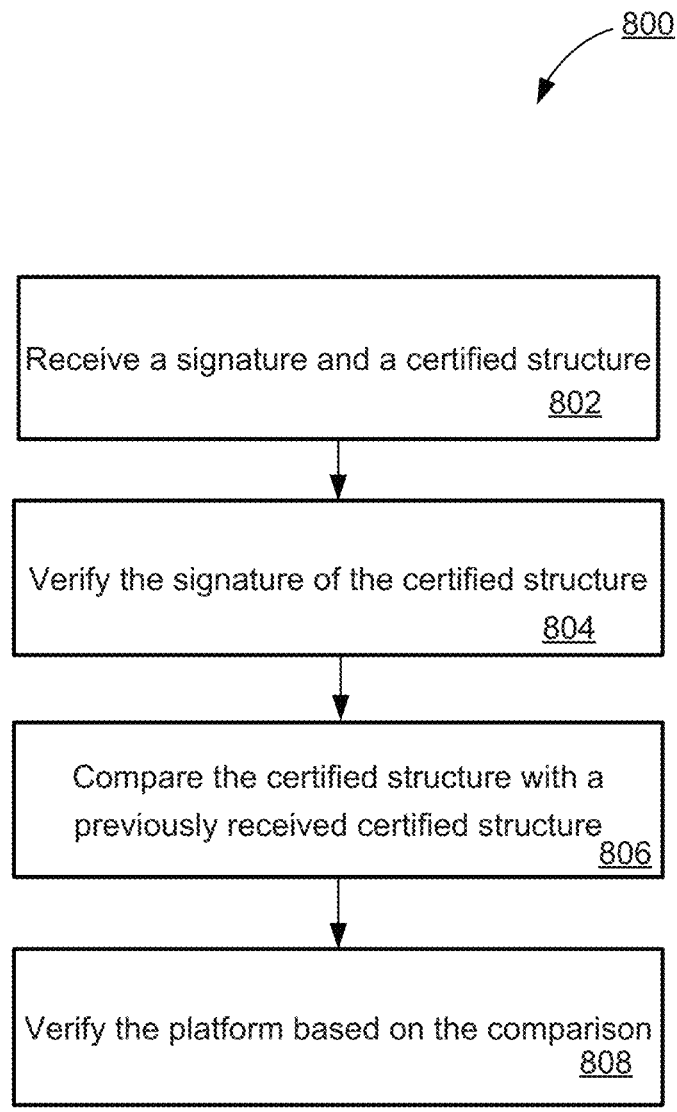
FIG. 8 illustrates a flow diagram of an exemplary process for verifying a state of a platform, according to some aspects of the disclosure In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

FIG. 8 illustrates a flow diagram of an exemplary process for verifying a state of a platform, according to some aspects of the disclosure. Process 800 may be used for verifying the state of a platform such as platform 100, 150, or 170 of FIGS. 1A-1C. Notably, one or more steps of process 800 described herein may be omitted, performed in a different sequence, and/or combined with other processes for various types of applications contemplated herein. Process 800 can be performed by a device, e.g., verifier device 352 of FIG. 3B, to verify the state of platform 100, 150, or 170. In some examples, a customer purchasing a platform can verify the provisioning state of the purchased platform is the same as the expected provisioning state of the platform. In some examples, a manufacturer of a platform can verify the state of the platform during manufacturing is the same as the expected state of the platform to confirm authentic platform components or software components were used when manufacturing the platform.

Process 800 begins at step 802, where a signature and a certified structure is received. The certified structure, e.g., certified structure 500, is described with respect to FIG. 5. In some examples, the signature corresponds to the certified structure. In some examples, and as shown in FIG. 3B, the signature and the certified structure may be received by verifier device 352 from platform 360, which platform 360 is consistent with platforms 100, 150, and 170, of FIGS. 1A-1C. The signature and the certified structure may be received from authentication module 320 of platform 360 where authentication module 320 is consistent with authentication modules 120, 160, and 180, of FIGS. 1A-1C, The signature and the certified structure may be received in response to verifier device 352 sending a request and also sending a special code, a nonce known to authentication module 320, with the request. In some examples, verifier device 352 may send user provided data 504 and/or 520 to authentication module 320 of platform 360 when requesting the signature and the certified structure. As noted, a signature is a signed hash of some data, e.g., a certified structure and user provided data. In some embodiments, to verify a signature, a verifier device 352 generates the hash of the same data. Also, the verifier device 352 uses the public key on the signature to get the hash of the data in the signature. If both hashes are identical then the signature is verified.

In step 804, the signature of the certified structure is verified. As described, the signature may correspond to the certified structure and when the signature is verified, the certified structure is verified. In some embodiments, an execution engine of authentication module 320, which is consistent with execution engine 422 of FIG. 4, may use a private key generated by a key generator consistent with key generator 416 of FIG. 4, to sign the signature. Authentication module 320 may provide the signature which may be verified using the public key associated with the private key to verifier device 352. Verifier device 352 may use the public key to verify the signature and the certified structure and also to verify the certified structure is authentic and is sent by authentication module 320.

In step 806, the certified structure is compared with a previously received certified structure. In some examples, the previously received certified structure is an expected, e.g., a predetermined, certified structure of a platform, e.g., platform 100 of FIG. 1. As described, the certified structure may uniquely determine a state of a platform, e.g., platform 100, 150, 170, or 360, of FIGS. 1A-1C or 3A. In some examples, verifier device 352 may have securely received a public key, a signature, and an authentic certified structure of the platform. Verifier device 352 may receive the public key and the signed authentic certified structure from a manufacturer of the platform and may store the public key and the signed authentic certified structure in a memory, e.g., memory 354 of FIG. 3B. In some examples, the signed authentic certified structure is a combination of the signature and the authentic certified structure. Verifier device 352 may verify the signature of the sinned authentic certified structure and store the certified structure in memory 354. By receiving and verifying another certified structure as described in steps 802 and 804, verifier device 352 may compare the received certified structure with the authentic certified structure that is stored in memory 354. In some examples, the manufacturer of the platform may provide the public key and the authentic certified structure through a website. In some examples, the comparison is made between one or more elements of the received certified structure and the authentic certified structure, e.g., between creation hashes 510.

In step 808, the platform is verified based on the comparison described in step 806. In some examples, when the outcome of the comparison in step 806 is a match, it is verified that the platform is authentic and the software or hardware of the platform used for provisioning has not been altered.

In some embodiments, the authentication module functions and responds based on one or more commands it receives through I/O block 402. Thus, a certification generated by the authentication module is based on the received commands. In some examples, the platform can be certified remotely. The hashes of the software elements corresponding to the software state and hardware manufacturer identities corresponding to the hardware state may be stored in platform configuration registers 408 and the platform configuration registers 408 may prevent a removal of the hashes of the software elements or the hardware manufacturer identities. In some embodiments, the operating system may deterministically be verified using the same ordered operating system events that are generated for each successive boot up. In some embodiments, the event may also be stored in the platform configuration registers 408 and the platform configuration registers 408 may prevent a removal of the events. In some embodiments, the authentication module may examine the events and the platform configuration register values that hold the hashes of the software elements to verify what software stack, e.g., firmware and/or operating system has been executed on the platform.

In some embodiments, the authentication module validates the received creation ticket to certify the creation ticket has been generated by a current platform. In some examples, the creation ticket may be stored on the platform or outside the platform where the creation ticket can be accessed when the platform needs certification.

In some embodiments, the operating system of the platform executes concurrent processes to take advantage of multiple processors and multiple cores of the processors. Therefore, the platform configuration register values may be unpredictable, e.g., un-deterministic, and may be made deterministic by using an ordered operating system events. In some embodiments, the platform firmware that implements UEFI behaves in a deterministic manner. However, operating systems like Linux and Windows are not deterministic. Therefore, to bring predictability to the operating system, the operating system is modified. In some examples, a Linux operating system may be created that supports a few services and thus produces a small operating system that may not behave randomly due to concurrency and scheduling. Additionally, support for multicore processing may be disabled to further make the operating system predictable. As the result the platform configuration register values of authentication module may become identical for each boot up of the platform.

In some embodiments, the verification is used by an end-user to verify that the platform is authentic and had correct software state and hardware state. In some embodiments, the verification can be used by a manufacturer to verify that a third party has supplied a correct software. In some examples, the software state of a platform or system can be generated by emulation/simulation during a design period and then can be verified after manufacturing the platform or the system. In some examples, the software state of a platform is determined based on the software stack of the platform and the hardware state of a platform is determined based on the manufacturer identities of the hardware modules of the platform. In some examples, the platform, e.g., platform 100 of FIG. 1A includes a hardware module, e.g., a coprocessor, for implementing authentication module 120 and the hardware module is uniquely tied to platform 100. Thus, the hardware state of platform 100 may be determined based on the manufacturer identity of the authentication module 120.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "module for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

What is claimed is:

1. A non-transitory machine-readable storage medium comprising instructions that upon execution cause an authentication module to:
   receive, at the authentication module, a software stack of a platform, wherein the software stack comprises a plurality of software elements, and wherein the software stack is uniquely determined;
   measure, at the authentication module, the plurality of software elements of the software stack to generate respective hashes of the plurality of software elements;
   generate, at the authentication module, a creation hash and a creation ticket, the creation hash being based on a value produced by combining the respective hashes of the plurality of software elements;
   store the creation hash in a secure memory of the authentication module;
   send the creation ticket from the authentication module to the platform in which the software stack is to execute; and
   after the sending of the creation ticket from the authentication module to the platform:
      receive, at the authentication module from the platform, a command to certify the creation ticket for verifying a state of the platform,
      in response to the command, retrieve the creation hash from the secure memory and certify the creation ticket based on the retrieved creation hash,
      after certifying the creation ticket, generate, at the authentication module, a certified structure comprising the creation hash, and sign the certified structure, and
      send the signed certified structure from the authentication module to the platform to verify the state of the platform.

2. The non-transitory machine-readable storage medium of claim 1, wherein the instructions upon execution cause the authentication module to:
   sign the certified structure with a signing key to create a signature.

3. The non-transitory machine-readable storage medium of claim 1, wherein the instructions upon execution cause the authentication module to:
   generate the creation ticket based on the creation hash.

4. The non-transitory machine-readable storage medium of claim 1, wherein the measurement of the plurality of software elements of the software stack comprises applying a cryptographic hash algorithm on the plurality of software elements.

5. The non-transitory machine-readable storage medium of claim 1, wherein the instructions upon execution cause the authentication module to:
   store the respective hashes of the plurality of software elements in registers of the authentication module; and
   generate the creation hash further based on register numbers of the register.

6. The non-transitory machine-readable storage medium of claim 1, wherein the software stack is uniquely determined based on the plurality of software elements being loaded in a deterministic order with each restart of the platform.

7. The non-transitory machine-readable storage medium of claim 6, wherein the plurality of software elements comprise a firmware and a component of an operating system.

8. The non-transitory machine-readable storage medium of claim 1, wherein the certified structure further comprises information identifying a version of a program executed by the authentication module.

9. The non-transitory machine-readable storage medium of claim 1, wherein the state of the platform comprises a hardware state of the platform and a software state of the platform.

10. The non-transitory machine-readable storage medium of claim 1, wherein the authentication module is implemented as a coprocessor.

11. A method comprising:
    receiving, at an authentication module, a software stack of a platform, wherein the software stack comprises a plurality of software elements, and wherein the software stack is uniquely determined;
    measuring, at the authentication module, the plurality of software elements of the software stack to generate respective hashes of the plurality of software elements;
    generating, at the authentication module, a creation hash and a creation ticket, the creation hash being based on a value produced by combining the respective hashes of the plurality of software elements;
    storing the creation hash in a secure memory of the authentication module;
    sending the creation ticket from the authentication module to the platform in which the software stack is to execute; and
    after the sending of the creation ticket from the authentication module to the platform:
       receiving, at the authentication module from the platform, a command to certify the creation ticket for verifying a state of the platform,
       in response to the command, retrieving the creation hash from the secure memory and certifying the creation ticket based on the retrieved creation hash,
       after certifying the creation ticket, generating, at the authentication module, a certified structure comprising the creation hash, and signing the certified structure, and
       sending the signed certified structure from the authentication module to the platform to verify the state of the platform.

12. The method of claim 11, further comprising:
    generating the creation ticket based on the creation hash.

13. The method of claim 11, wherein the measurement of the plurality of software elements of the software stack comprises applying a cryptographic hash algorithm on the plurality of software elements.

14. The method of claim 11, comprising:
storing the respective hashes of the plurality of software elements in registers of the authentication module,
wherein the generating of the creation hash is further based on register numbers of the registers.

15. The method of claim 11, wherein the software stack is uniquely determined based on the plurality of software elements being loaded in a deterministic order with each restart of the platform.

16. The method of claim 15, wherein the plurality of software elements comprise a firmware and a component of an operating system.

17. The method of claim 11, wherein the certified structure further comprises information identifying a version of a program executed by the authentication module.

18. A system comprising:
at least one processor; and
an authentication module comprising:
a memory;
a storage to store machine-readable instructions executable by the authentication module to:
receive a software stack of a platform, wherein the software stack comprises a plurality of software elements, and wherein the software stack is uniquely determined;
measure the plurality of software elements of the software stack to generate respective hashes of the plurality of software elements;
generate a creation hash and a creation ticket, the creation hash being based on a value produced by combining the respective hashes of the plurality of software elements;
store the creation hash in the memory of the authentication module;
send the creation ticket from the authentication module to the at least one processor on which the software stack is to execute; and
after the sending of the creation ticket from the authentication module to the at least one processor:
receive, at the authentication module from the at least one processor, a command to certify the creation ticket for verifying a state of the platform,
in response to the command, retrieve the creation hash from the memory and certify the creation ticket based on the retrieved creation hash,
after certifying the creation ticket, generate, at the authentication module, a certified structure comprising the creation hash, and sign the certified structure, and
send the signed certified structure from the authentication module to the at least one processor,
wherein the at least one processor is to verify the state of the platform based on the signed certified structure.

19. The system of claim 18, wherein the machine-readable instructions are executable by the authentication module to:
store the respective hashes of the plurality of software elements in registers of the authentication module,
wherein the generating of the creation hash is further based on register numbers of the registers.

20. The system of claim 18, wherein the software stack is uniquely determined based on the plurality of software elements being loaded in a deterministic order with each restart of the platform.

\* \* \* \* \*